United States Patent
Magne et al.

(10) Patent No.: US 9,533,431 B2
(45) Date of Patent: Jan. 3, 2017

(54) PROCESS AND EQUIPMENT FOR PRODUCING A RUBBER FOR A TIRE COMPRISING A KNEADING STEP

(75) Inventors: Andre Magne, Clermont-Ferrand (FR); Christian Vacheron, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 446 days.

(21) Appl. No.: 14/117,532

(22) PCT Filed: May 11, 2012

(86) PCT No.: PCT/FR2012/051042
§ 371 (c)(1),
(2), (4) Date: Aug. 19, 2014

(87) PCT Pub. No.: WO2012/156623
PCT Pub. Date: Nov. 22, 2012

(65) Prior Publication Data
US 2014/0360656 A1     Dec. 11, 2014

(30) Foreign Application Priority Data

May 13, 2011  (FR) ..................... 11 54190

(51) Int. Cl.
*B29B 7/56* (2006.01)
*B29C 43/24* (2006.01)
(Continued)

(52) U.S. Cl.
CPC .............. *B29B 7/56* (2013.01); *B29B 7/566* (2013.01); *B29B 7/606* (2013.01); *B29B 7/7495* (2013.01);
(Continued)

(58) Field of Classification Search
CPC .............. B29B 7/56; B29B 7/566; B29B 7/66; B29B 7/7495; B29B 7/88; B29B 7/60; B29B 7/606; B29C 43/24; B29C 2043/486

See application file for complete search history.

(56) References Cited

U.S. PATENT DOCUMENTS

| | | | |
|---|---|---|---|
| 3,075,238 A * | 1/1963 | Hale | B29B 7/566 264/343 |
| 4,840,491 A | 6/1989 | Hagiwara et al. | |
| 2009/0238027 A1* | 9/2009 | Yamaguchi | B29B 7/28 366/73 |

FOREIGN PATENT DOCUMENTS

| CN | 1704223 A | 7/2004 |
|---|---|---|
| CN | 201544364 U | 8/2010 |

(Continued)

OTHER PUBLICATIONS

Machine translation of Chinese Patent Publication No. CN-201544364U, originally published Aug. 2010, 4 pages.*

(Continued)

*Primary Examiner* — William Bell
(74) *Attorney, Agent, or Firm* — Dickinson Wright PLLC

(57) ABSTRACT

In the process for producing a rubber for manufacturing a tire:
  a calender forms a ply with a mixture of ingredients of the rubber while a conveyor moves the ply in a first direction,
  a mass of product other than the rubber is deposited on the ply, and
  the conveyor displaces the ply in a second direction, such that the mass is arranged between two faces of the ply extending one against the other.

13 Claims, 1 Drawing Sheet

(51) Int. Cl.
   *B29B 7/60*  (2006.01)
   *B29B 7/74*  (2006.01)
   *B29B 7/88*  (2006.01)
   B29C 43/48  (2006.01)

(52) U.S. Cl.
   CPC ............... *B29B 7/88* (2013.01); *B29C 43/24* (2013.01); *B29C 2043/486* (2013.01)

(56) References Cited

FOREIGN PATENT DOCUMENTS

| | | |
|---|---|---|
| CN | 201544364 U | 8/2010 |
| DE | 112005002546 T5 | 9/2007 |
| EP | 0979714 A1 | 2/2000 |
| JP | 62278005 A | 12/1987 |
| JP | H0464110 A | 6/1992 |
| JP | 2829879 B2 * | 12/1998 |
| JP | 2004181805 A | 7/2004 |
| JP | 2007216596 A * | 8/2007 |

OTHER PUBLICATIONS

PCT/FR2012/051042, International Search Report (English translation included), dated Sep. 6, 2012, 4 pages.
Chinese Office action for Application No. 2015010801065670 dated Jan. 13, 2015.
Notification of First Office Action dated Jan. 13, 2015.

* cited by examiner

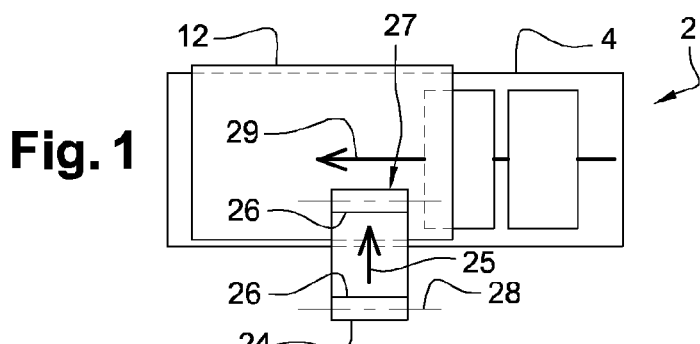
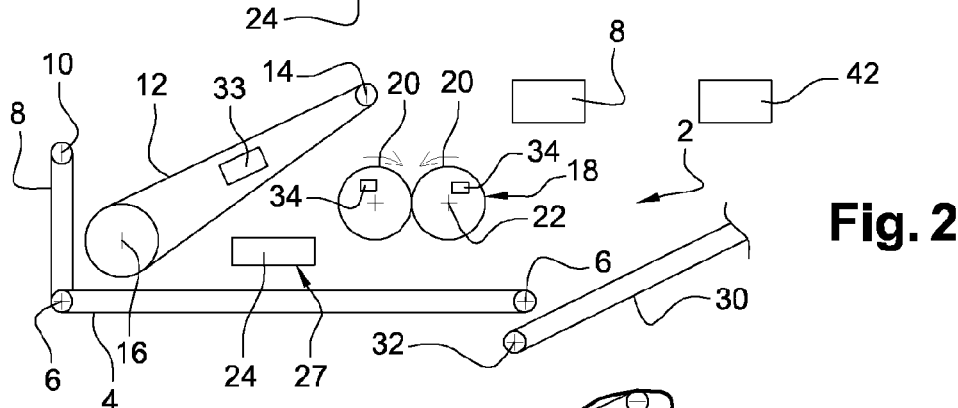
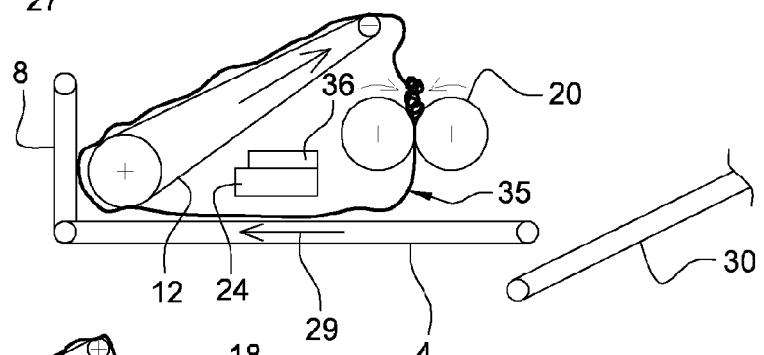
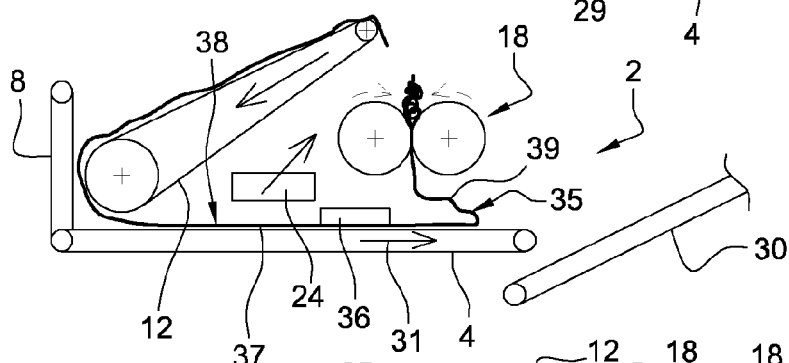
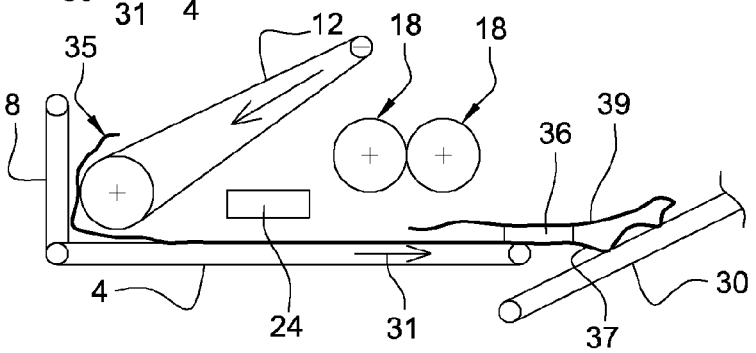

PROCESS AND EQUIPMENT FOR PRODUCING A RUBBER FOR A TIRE COMPRISING A KNEADING STEP

This application claims benefit of the filing date of PCT/FR2012/051042, filed May 11, 2012, which claims the benefit of FR1154190, filed May 13, 2011, the entire contents of each of which are incorporated herein by reference for all purposes.

BACKGROUND

1. Field

The invention relates to the production of a rubber for manufacturing a tire.

2. Description of Related Art

It is known that the production of a rubber for a tire for the wheels of a vehicle involves successive mixing steps. Firstly, elastomeric materials are mixed with a charge of carbon black or silica. This mixing process takes place in the tank of a mixer and results in a rise of the temperature of the mixture, which may reach 170° C. for example. This mixture is then transferred to a station where it continues to be worked whilst being cooled. This working takes place by circulating the mixture between two cylinders so as to form it into a ply. The cooling means of the station lower the temperature to approximately 80° C.

It is known to add to the rubber a product that promotes vulcanization of the rubber during its subsequent baking. So as not to risk premature partial vulcanization of the rubber, the vulcanizing product is not incorporated at the same time as the other ingredients. It is therefore only once the above-mentioned steps have been carried out that the mixture is transferred to a finishing station, where the vulcanizing product is added to the mixture and is mixed therewith.

An arrangement of this type is described for example in document DE-11 2005 002546 T5.

But the properties of the rubber during the vulcanization process are very sensitive to the proportions of the ingredients forming the mixture. Thus, if the quantity of vulcanizing product is not added to the mixture in the correct proportions, vulcanization may therefore be either too quick, or insufficient, which in either case compromises the qualities of the rubber and those of the finished tire.

SUMMARY

The objective of the disclosure is to ensure that the correct proportions of the ingredients of the mixture forming the rubber are observed.

To this end, a process for producing a rubber for manufacturing a tire is provided, in which:
- a calendar forms a ply with a mixture of ingredients of the rubber whilst a conveyor moves the ply in a first direction,
- a mass of product other than the rubber is deposited on the ply, and
- the conveyor moves the ply in a second direction, such that the mass is arranged between two faces of the ply extending one against the other.

The changing of the direction of the conveyor thus makes it possible to arrange the product between two portions of the ply. The rubber and the product are thus prevented from being separated from one another during the rest of the process for producing the rubber. It is thus ensured that the final proportions of the ingredients of the rubber are better observed.

The ply is advantageously circulated in the form of a closed loop.

This kneading thus makes it possible to work the rubber effectively and quickly.

A device comprising the calender and the conveyor may open the loop so as to form two free ends of the ply.

This opening makes it possible to easily discharge the ply.

The product forming the mass preferably comprises a compound promoting the vulcanization of the rubber.

The process of the invention is not limited to this case, since it also allows the addition to the mixture of complementary products other than a vulcanizing product, but is well suited to such a product, the observance of the proportions being of great importance.

The product is preferably deposited only once a temperature of the ply has become less than a predetermined threshold.

The rubber is therefore left to reach a temperature compatible with the addition of the product.

The ply is discharged from a device comprising the calender and the conveyor, advantageously together with the mass arranged between the two faces extending one against the other.

The complementary product is thus added to the rubber not as it arrives at the final mixing station, but before it leaves the station in which the ingredients, except for the product, are mixed. This product does not leave the mixture before the arrival at the finishing station. The attainment of a rubber having the expected properties is therefore favoured.

The conveyor preferably carries out the discharge in the second direction.

In accordance with the invention, a piece of equipment for producing a rubber, able to implement a method according to an embodiment of the invention, and comprising a calender, a first conveyor and a second conveyor able to dispense the mass directly onto a portion of the ply carried by the first conveyor, is also provided.

The production of a ply fold in which the product mass is arranged is thus facilitated.

These two conveyors ensure the movements in the respective, non-co-planar directions. The second conveyor preferably has an end arranged above and opposite the first conveyor. In addition, the second conveyor does not extend in the vertical extent of the calender and is therefore arranged neither above nor below the calender.

The equipment advantageously comprises cooling means within the calender.

Such means make it possible to accelerate the temperature drop of the rubber compared to the situation in which the calender would only have been cooled by contact with the ambient air.

The second conveyor preferably extends upstream of the calender with respect to a discharge direction outside the equipment by the first conveyor.

The equipment advantageously comprises a third conveyor, which is inclined with respect to the vertical direction and has an end located above the calender.

This conveyor makes it possible to circulate the ply in a closed loop.

Equally, the equipment may comprise cooling means within the third conveyor.

Here again, such means make it possible to accelerate the temperature drop of the rubber.

The second conveyor advantageously has an end located below the third conveyor.

BRIEF DESCRIPTION OF THE DRAWINGS

Further features and advantages of the invention will become clearer from the following description of a non-limiting embodiment given by way of example and with reference to the accompanying drawings, in which:

FIGS. 1 and 2 show a plan view and a view from above respectively of a kneading station of a piece of equipment for producing a rubber according to an embodiment of the invention; and FIGS. 3, 4 and 5 illustrate successive steps of the present embodiment of the process of the invention by means of the equipment in FIGS. 1 and 2.

DETAILED DESCRIPTION OF SPECIFIC EMBODIMENTS

A station 2 of a piece of equipment for producing a rubber for a tire according to an embodiment of the invention has been illustrated in FIGS. 1 and 2. The tire may be a tire for the wheels of a lightweight vehicle, a passenger vehicle, a utility vehicle, a heavy goods vehicle, or else for the wheels of an engineering machine.

The station 2 comprises a lower horizontal belt 4 in the form of an endless band able to circulate whilst being held and driven between two rolls 6, of which the axes defining the axes of rotation are horizontal and mounted rotatably relative to a frame 8 of the station. The two walls of the belt are horizontal.

Similarly, the station comprises a vertical belt 8 provided in the form of an endless band able to circulate whilst being held and driven between one of the rolls 6 and a roll 10 extending above the first-mentioned roll. The two walls of the belt 8 are vertical.

The station 2 also comprises a rising belt 12 in the form of an endless loop able to circulate whilst being supported and driven by an upper roll 14 and a lower roll 16 of greater diameter than the roll 14. The roll 14 extends at a distance from the roll 16 in the horizontal direction and in the vertical direction. The belt 12 comprises inner cooling means 33 arranged between the two layers of the band or in at least one of the rolls 6, 10.

The station 2 further comprises a calender 18 comprising two identical cylinders 20 arranged in a mutually opposed manner with their geometric axes of rotation 22 parallel to one another. The two rolls extend at a distance from one another and above the horizontal belt. The calender comprises cooling means 34 within the rolls.

All the axes of the aforementioned rolls 6, 10, 14, 16 as well as the axes 22 of the cylinders are horizontal and parallel to one another.

The station 2 also comprises a horizontal introduction belt 24 having a band in the form of a closed loop able to circulate whilst being held and driven by two rolls 26 having horizontal axes 28 parallel to one another and perpendicular to the aforementioned axes. The upper horizontal wall of the belt 24 moves in a direction 25 perpendicular to the direction 29 of movement of the wall of the lower belt 4. In addition, the belt 24 is able to circulate such that the products arranged on its upper face are discharged therefrom via the end 27 located in the upper part of FIG. 1. This end extends above the lower belt 4, opposite the latter, approximately halfway between its ends formed by the rolls 6.

Lastly, the station comprises a transfer belt 30 having a band provided in the form of a closed loop able to circulate whilst being held and driven by rolls 32, of which only one is visible in FIG. 2. This roll has an axis parallel to that of the roll 6 and extends below the latter.

The roll 14 extends above one of the cylinders 20, without covering the other cylinder 20. The rising belt 12 extends above part of the introduction belt 24 and in particular from its discharge end. The roll 16 extends opposite the two belts 4 and 8 and the cylinder 6 supporting said two belts. The introduction belt 24 is located to the side of the calender 18, without being arranged in the vertical extent thereof.

The equipment is controlled so as to carry out the process of the invention in the following manner.

In a station (not illustrated) of the equipment, a natural elastomer, a synthetic elastomer, and a charge formed for example by carbon black or silica are mixed in a tank, said station being arranged upstream of the station 2. At this stage, vulcanizing product is not incorporated in the mixture.

At the end of this mixing phase, the mixture is discharged via a lower opening in the tank and this rubber mass 35 is transferred towards the station 2 of the equipment.

The rubber mass 35 passes in the calender 18 between the cylinders 20 turning in opposite directions and forms a ply. The lower belt 4 is moved such that its upper wall moves towards the left as indicated in FIG. 3. The vertical belt 8 is moved such that its right-hand wall moves upwards. The rolls 14 and 16 are turned in a clockwise direction such that the upper wall of the belt 12 rises during the movement of this belt.

During its passage through the calender, the rubber forms a ply which deposits on the upper wall of the lower belt 4 and is transferred in the direction of the vertical belt.

An operator places an end part of this ply around the lower roll 16, such that this part is driven over the rising belt, passing between this belt and the vertical belt 8. The ply travels over the rising belt 12, passes the roll 14, and falls again in the direction of the calender, where it accumulates again.

A closed-loop ply is thus formed, which circulates continuously in the clockwise direction, as indicated in FIG. 3, from the calender to the lower belt, then over the rising belt and again through the calender, and does so a number of times. During this movement, the rubber accumulates in the calender upstream of the rolls so as to reform a ply at the exit of said rolls. This circulation thus causes continued mixing and kneading of the ingredients. During this movement, the cooling means 34 lower the temperature of the rubber, which additionally experiences a lowering of its temperature due to its contact with the air and the other elements of the station 2. Whereas its temperature reached 170° C. before its arrival at the station, it reaches approximately 80° C. at the end of this circulation. These values are given merely by way of example. The circulation of the ply for example takes within one and four minutes, preferably over two minutes.

To end this circulation, a reversal of the direction of movement of the rising belt 12 is commanded, as illustrated in FIG. 4, whilst continuing the rotation of the cylinders 20 as before. This leads to a rupture of the ply between the roll 14 and the calender and therefore to the opening of the loop. At the same moment, the reversal of the direction of movement of the lower belt is commanded so as to initiate the movement of the ply in the direction of the transfer belt 30 in the direction 31, that is to say to the right in the figures.

At the same moment also, a block of vulcanizing product 36 is introduced into the station. This product is a mixture of sulphur and a retarder product, for example. This block, in this case, has a rectangular parallelepipedic shape. It forms a product mass proportioned to the constituents of the mixture forming the rubber. The block 36 is introduced via the belt 24, which guides the block via its upper wall as far as the discharge end 27 and dispenses it directly onto a portion 37 of the ply carried by the lower belt 4 and thus being located in the lower half of the latter. The block is therefore arranged on an upper face 38 of a portion 37 of the ply of which the kneading at the station 2 is now complete since this portion will no longer pass again through the calender. At the moment of deposition of the block on the ply, part of the ply is still carried over the entire upper face of the rising belt 12, and another part is carried by the calender 20, through which it is passing for the last time.

During the continuation of the movements of the different elements of the station 2, the portion 37 of the ply carrying the block is moved therewith towards the right, whereas the end portion 39 of the ply passing through the calender is moved progressively over this portion so as to cover it and also the block. The block is therefore arranged between the inner faces of the two portions 37, 39 of the ply extending one against the other and one above the other. A two-layer fold or arrangement is thus formed, in which the block is housed. It should be noted here that the end of the belt 24 is located upstream of the calender with respect to the movement of the belt 4 towards the right.

The continuation of the movement of the rising belt discharges the other end part of the ply towards the horizontal belt. The ply is transferred progressively over the transfer belt 30.

Still in the same configuration with the block between the two ply portions, the assembly is then sent towards a finishing station, where the ply and the vulcanizing block are mixed.

The rubber 35 and the vulcanizing block 36 are thus transported from the station 2 towards the station following the equipment in a configuration such that the block is enveloped in the ply. As a result, material losses of vulcanizing product are avoided during the transfer of this assembly.

It should be stressed that the block 36 is not mixed with the rubber of the ply 35 and is not kneaded therewith within the station 2. These procedures are only performed in a subsequent station of the equipment. It is also stressed that the block is arranged against a face of a part of the ply of which the kneading was completed in the station 2.

The equipment may comprise control means 42 able to control all or some of the process steps just described. These means advantageously comprise one or more computers having microprocessors and memories as well as a program comprising code instructions able to control the execution of these steps when these instructions are run on a computer.

Of course, numerous modifications can be applied to the invention, without departing from the scope thereof.

The invention claimed is:

1. Process for producing a rubber for manufacturing a tire, comprising:
   forming a ply by a calender with a mixture of ingredients of the rubber whilst a conveyor moves the ply in a first direction,
   depositing a mass of product other than the rubber on the ply, and
   moving the ply by the conveyor in a second direction, such that the mass is arranged between two faces of the ply extending one against the other.

2. Process according to claim 1, wherein the ply is circulated in the form of a closed loop.

3. Process according to claim 2, wherein a device comprising the calender and the conveyor opens the loop so as to form two free ends of the ply.

4. Process according to claim 1, wherein the product forming the mass comprises a compound promoting the vulcanization of the rubber.

5. Process according to claim 1, wherein the product is deposited only once a temperature of the ply has become lower than a predetermined threshold.

6. Process according to claim 1, wherein the ply is discharged from a device comprising the calender and the conveyor, together with the mass arranged between the two faces extending one against the other.

7. Process according to claim 6, wherein the conveyor carries out the discharge in the second direction.

8. Equipment for producing a rubber, able to carry out a process according to claim 1, and which comprises a calender, a first conveyor, and a second conveyor, the equipment being able to circulate the ply in a closed loop by passing the ply through the calender and on the first conveyor which moves the ply in the first direction,
   the second conveyor being able to dispense the mass directly onto a portion of the ply carried by the first conveyor when the ply circulates in a closed loop,
   the first conveyor being then able to move the ply in a second direction, such that the mass is arranged between two faces of the ply extending one against the other.

9. Equipment according to claim 8, further comprising cooling means within the calender.

10. Equipment according to claim 8, wherein an end of the second conveyor is located upstream of the calender with respect to a discharge direction, the discharge direction being defined as movement of the first conveyor in a direction outside of the equipment.

11. Equipment according to claim 8, further comprising a third conveyor, which is inclined with respect to the vertical direction and has an end arranged above the calender.

12. Equipment according to claim 11, further comprising cooling means within the third conveyor.

13. Equipment according to claim 11, wherein the second conveyor has an end arranged below the third conveyor.

* * * * *